Nov. 28, 1933. C. P. NOSER Re. 19,011

RAILWAY TRUCK

Original Filed June 24, 1926 2 Sheets-Sheet 1

Inventor
Charles P. Noser
Ernest J. Mockl
Attorney

Nov. 28, 1933. C. P. NOSER Re. 19,011

RAILWAY TRUCK

Original Filed June 24, 1926 2 Sheets-Sheet 2

Inventor
Charles P. Noser
Ernest J. Mecke
His Attorney

Reissued Nov. 28, 1933 Re. 19,011

UNITED STATES PATENT OFFICE 19,011

RAILWAY TRUCK

Charles P. Noser, Rochester, N. Y., assignor to The Symington Company, New York, N. Y., a corporation of Maryland Original No. 1,785,970, dated December 23, 1930, Serial No. 113,289, June 24, 1926. Application for reissue November 19, 1931. Serial No. 576,186

19 Claims. (Cl. 105—223)

This invention relates to trucks and, more particularly, to railway car trucks having roller bearings with provision for allowing angling of the journal box containing said bearings with respect to the supporting frame.

The principal object of my invention, generally considered, is the provision of a car truck having side frames between the upper and lower end extensions of which are positioned journal boxes which are preferably of the roller bearing type, said journal boxes being connected to said side frame extensions and so formed that the desired amount of angling with respect thereto as well as vertical movement therebetween is permitted whereby the tendency to unevenly load the axles and roller bearings is obviated.

An object of my invention is the provision of a car truck, the side frames of which have upper and lower end extensions with journal boxes positioned between said extensions and pedestal means positioned on either side of each journal box and spacing said extensions to allow clearance between the same and the box, through bolts being preferably provided joining the extensions and pedestal means, said box being formed with flanges or guides embracing or cooperating with said pedestal means, sufficient clearance, however, being provided to allow relative motion of the box with respect thereto.

Another object of my invention is the provision of a car truck, preferably having roller bearing journal boxes connected at the ends of the side frames thereof between pedestal means, said means being sufficiently long to space the upper and lower side frame members a sufficient distance for providing the desired amount of clearance between the bottom of the journal box and the corresponding tie member to provide a flexible connection between said box and frame.

A further object of my invention is the provision in a truck of the class under consideration of journal box bolts extending between the end portions of the side frame and properly supporting pedestal pieces therebetween, the corresponding journal box being positioned between said pedestal pieces and bolts and formed with guides engaging said pedestal pieces, the spacing between the end portions of the frame being such that vertical movement of the box on the pedestal pieces is permitted, said pedestal pieces being alternatively formed with rounded portions to permit angling of the box in a horizontal plane and the box being preferably crowned on its upper surface to permit angling thereof in a vertical plane.

Other objects and advantages of the invention relating to the particular arrangement and combination of the various parts will become apparent as the description proceeds.

Referring to the drawings illustrating my invention, the scope whereof is defined by the appended claims:

Figure 1:
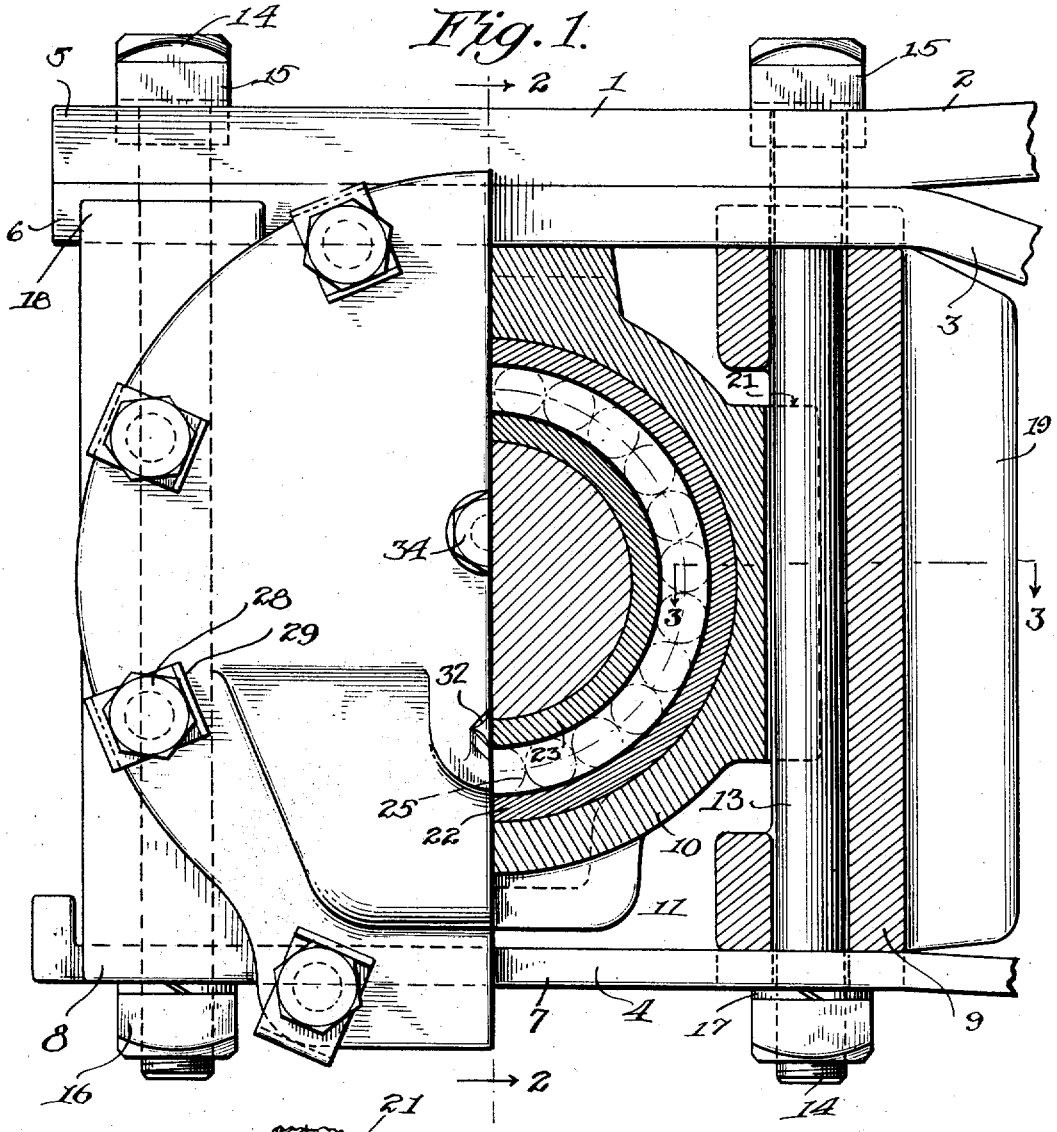
Figure 1 is a side elevation of a portion of a railway car truck shown partly in longitudinal vertical section centrally of one of the side frames thereof.
Figure 3:
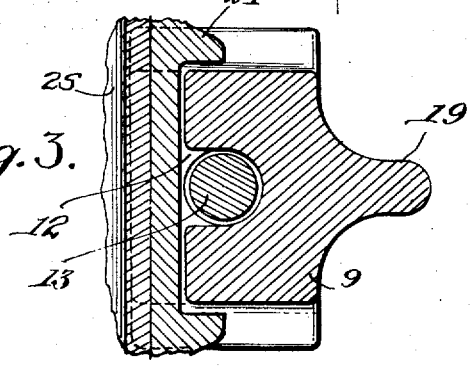
Figure 3 is a fragmentary horizontal sectional view on the line 3—3 of Figure 1 looking in the direction of the arrows.
Figure 2:
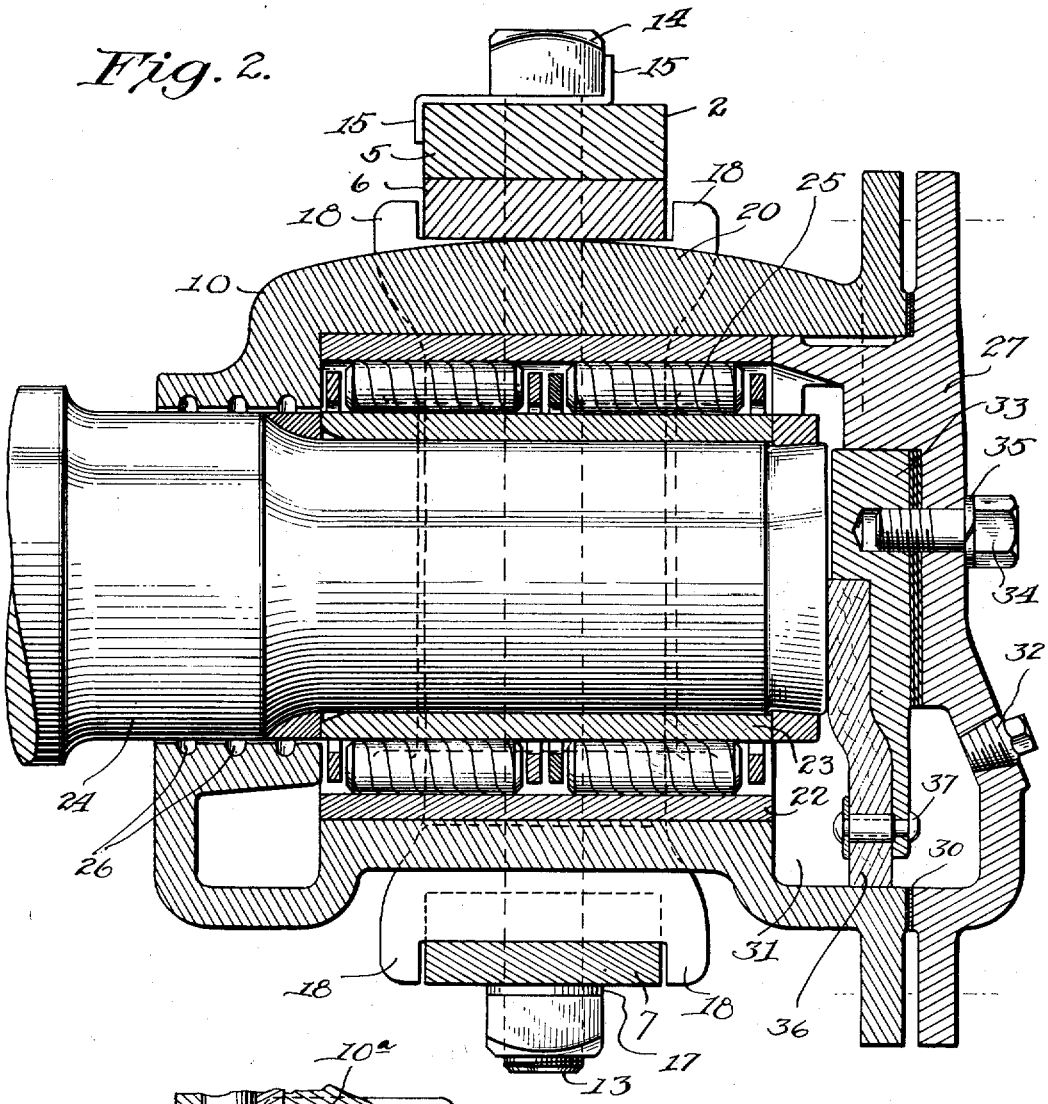
Figure 2 is a transverse vertical section on the line 2—2 of Figure 1 looking in the direction of the arrows.

Referring to the drawings in detail, like parts being designated by like reference characters and first considering the embodiment of my invention illustrated in Figures 1, 2 and 3, one end of a car side frame is illustrated although I do not wish to be limited to such a showing as the principles of my invention may be embodied in other forms of trucks than here illustrated. Although a side frame 1 of the arch bar type having a compression member 2, a tension member 3 and a tie member 4 is illustrated, I do not wish to be restricted to such a showing as my invention may be embodied in a side frame of other construction than that shown.

The substantially horizontal overlapping end extensions 5 and 6 of the compression and tension members 2 and 3 of the side frame are preferably spaced from the corresponding extension 7 of the tie member 4 by means of a plurality of pedestal members or means 8 and 9, respectively, forming jaws depending from the side frame adjacent the ends, said pedestal means being sufficiently long and spaced apart a sufficient distance and preferably notched to accommodate the journal box 10 therebetween while allowing clearance 11 between the bottom of said journal box and the top of the tie member extension 7 for allowing vertical movement and angling of said journal box with respect to the frame. These pedestal pieces 8 and 9 are preferably provided with slots 12 therein receiving through connecting bolts 13 preferably extending vertically, when in normal position, as shown, and provided with heads 14 prevented from turning by rotation preventing means 15 while the nuts 16 are being tightened thereon, lock washers 17 being advantageously used as indicated. The pedestal means 8 and 9 are preferably bifurcated at their ends to form flange portions 18 extending around the adjacent frame member for holding the pedestal means square with respect thereto. The inner and if desired both pedestal means may advantageously be formed with strengthening means such as the rib or flange portion 19, shown most clearly in Figure 3.

Figure 4:
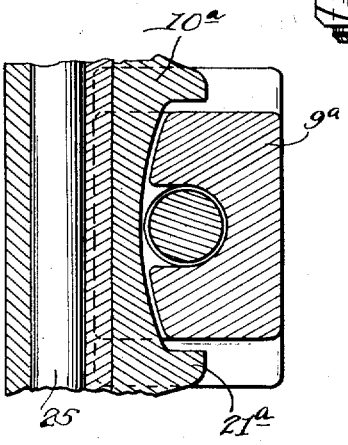
Figure 4 is a fragmentary sectional view corresponding substantially to Figure 3 but showing a modification of my invention.

The journal box 10 is preferably positioned between the end extensions of the side frame and the pedestal means or side frame jaws 8 and 9, as shown, the upper surface or roof of said box being preferably crowned or curved longitudinally of the box and straight transversely thereof as indicated at 20 to engage a dissimilar or flat surface on the adjacent portion of the frame 1 to allow angling between said box and frame in an upright or vertical plane while holding the same against axial rotation. The sides of the journal box adjacent the pedestal means 8 and 9 are preferably formed with guiding portions or flanges 21 extending on either side of the adjacent portions of the pedestal means 8 and 9 with sufficient clearance for allowing a slight amount of angling in a horizontal plane. A greater amount of angling in such a plane is satisfactorily provided for, as shown in the modification illustrated in Figure 4 in which modification the pedestal means $9^a$, as well as the corresponding pedestal means on the opposite side of the journal box, is crowned or curved horizontally while preferably extending vertically as shown, where it engages the guiding portion of the journal box $10^a$, said guiding portion being preferably formed of a corresponding curvature with sufficient clearance between the same and the flange or lip portions $21^a$ thereon. Except for this change to provide complementary arc shaped surfaces on the box and frame to facilitate lateral angling, which surfaces are also spaced apart to provide for limited bodily lateral movement therebetween, the second modification may be the same as illustrated in Figures 1, 2 and 3, it being understood that the pedestal pieces of either modification may be alternatively formed with or without strengthening flanges or ribs 19.

Positioned within the journal box in accordance with usual practice with roller bearing journal boxes is a bushing or roller bearing raceway 22 and inwardly spaced from said bushing 22 is another bushing 23 surrounding the journal 24 and between said bushings are roller means 25 which may be of standard construction. The details shown for holding the bushing 23 on the journal may be of standard construction not necessitating further description and the usual form of grease grooves 26 may be provided, if desired. The journal box is preferably closed at its outer end by means of a cover or lid 27 preferably connected thereto by means of cap bolts 28 preferably formed with any desired type of locking means 29. A gasket 30 of the usual character may be provided between the lid 27 and journal box 10 to provide a liquid tight oil or grease compartment 31. A plug 32 may be provided for permitting access to the compartment 31 for inserting the desired lubricant therein.

A thrust bearing 33 may be provided on the inside of the lid 27, said bearing being held in place in the present instance by means of a cap bolt 34 provided with locking washer 35. For lubricating the thrust bearing 33, an oil feeding wick or other means 36 may be provided, held in place as shown particularly in Figure 2 by means of a screw or other connecting means 37.

It will be apparent that by virtue of the aforedescribed construction, a connection between a journal which is preferably of the roller bearing type and an associated side frame is provided allowing a limited amount of vertical movement therebetween and angling in all directions thereby obviating the tendency to unevenly load the axle and roller bearing when the truck is rounding a curve. Such flexibility is more necessary in a roller bearing box than with the usual design in which a brass is applied to the top of the axle because the axle in this case is completely surrounded by the bearing and housing and it is not possible when the truck is thrown out of square for the axle to float comparatively free within the box. By using through journal box bolts instead of short bolts, top and bottom, the connection between the frame, pedestals and journal boxes is facilitated and the connecting nuts are more readily applied and kept tight.

Having now described my invention, I claim:

1. In a railway truck, in combination, a side frame having upper and lower end extensions, a journal box positioned between said extensions, pedestal means spacing said extensions to allow clearness therebetween with respect to the box and notched to accommodate side portions thereof, and through bolts joining said extensions and pedestal means, said box being provided with flanges embracing said pedestal means with sufficient clearance to allow relative motion of the box with respect thereto, at least one of the engaging surfaces at the top of the box and the upper side frame extension being curved to permit rocking movement therebetween.

2. In a railway truck, in combination, a side frame having compression and tension members extended at their ends, a tie member extended beneath the compression and tension member extensions, a journal box positioned between said compression and tension member extensions and tie member extension, pedestal means spacing said compression and tension member extensions from the tie member extension a sufficient distance to allow clearance between the same and the box and notched to accommodate side portions of the box, and through bolts joining said extensions and pedestal means on either side of said journal box, said box being provided with flanges extending on either side of said pedestal means and provided with sufficient clearance to allow relative motion with respect thereto.

3. In a railway truck, in combination, a side frame having an end extension from its upper portion, a journal box positioned below said extension, a tie member extending from the frame below said journal box, pedestal means notched to fit the box and spacing said tie member and side frame extension a sufficient distance to allow clearance between the bottom of the journal box and said tie member for flexibly connecting said box and frame and through bolts joining said extension, tie member and pedestal means, said box being formed with flanges extending inwardly and outwardly of said pedestal means for holding said box in place while allowing for a slight amount of motion with respect thereto.

4. In a railway truck, in combination, a side frame having upper and lower end extensions, pedestal pieces positioned between said extensions, a journal box located between said pedestal pieces and provided with guides engaging said pedestal pieces, said pedestal pieces being notched to clear the box, sufficient clearance being provided between said lower end extension and journal box to allow vertical movement of the box on the guides, and through bolts joining said extensions and pedestal pieces.

5. In a railway truck, in combination, a side frame having upper and lower end extensions, a journal box positioned between said extensions and crowned on its upper surface for permitting rocking movement with respect to said upper extension, pedestal means spacing said extensions and providing clearance between the same and the box and notched to clear said box, and through bolts joining said extensions and pedestal means, said box being provided with normally vertical guides embracing said pedestal means and provided with clearance therebetween.

6. In a railway truck, in combination, a side frame having upper and lower end extensions, a journal box positioned between said extensions, pedestal means extending on either side and spacing said extensions to allow clearance between the same and the box, the faces of the pedestal means adjacent said journal box being rounded and the journal box being provided with adjacent guiding portions of corresponding contour with clearance provided therebetween for allowing said box to rotate slightly between said pedestal means, and means joining said extensions and pedestal means.

7. In a railway truck, in combination, a side frame having upper and lower end extensions, a journal box positioned between said extensions, pedestal means extending on either side of said box and spacing said extensions to allow clearance between them and the box, the upper surface of said box being crowned for permitting rocking movement with respect to said upper extension, the faces of the pedestal means adjacent said journal box being rounded and the journal box being formed with similarly rounded cooperating guiding portions with clearance therebetween for allowing said box to rotate slightly with respect to said pedestal means, and means joining said side frame extensions and pedestal means for retaining said box in place.

8. In a railway truck, in combination, a side frame designed for use with the roller bearing journal boxes and having upper and lower end extensions, a journal box positioned between said extensions, pedestal means extending on either side of said box and spacing said extensions to allow clearance between them and the box, the upper surface of said box being crowned for permitting rocking movement with respect to said upper extension, the faces of the pedestal means adjacent said journal box being rounded and the journal box being formed with correspondingly rounded cooperating guiding portions with clearance therebetween for allowing said box to rotate slightly with respect to said pedestal means, and means joining said side frame extensions and pedestal means for retaining said box in place.

9. In a railway truck, in combination, a side frame designed for use with roller bearing journal boxes and having upper and lower end extensions, a journal box positioned between said extensions, pedestal means spacing said extensions to allow clearance therebetween with respect to the box and notched to receive the side portions of said box, and bolts joining said extensions and pedestal means, said box being provided with guides cooperating with said pedestal means with sufficient clearance to allow relative motion of the box with respect thereto.

10. In a truck, in combination, a side frame having upper and lower end extensions, a journal box positioned between said extensions, a journal received in said box, roller bearing means disposed between said journal and box, pedestal means spacing the side frame extensions to allow clearance therebetween with respect to the box and notched to accommodate the side portions of said box, and through bolts joining said extensions and pedestal means, said box being formed with portions embracing said pedestal means with sufficient clearance allowed to permit relative motion of said box with respect to the frame, at least one of the engaging surfaces between the box and mounting portions of the truck being curved to permit relative angling of said box.

11. In a truck, in combination, a side frame designed for use with roller bearing journal boxes and having upper and lower end extensions, a roller bearing journal box positioned between said extensions, pedestal means extending on either side of said box and spacing said extensions to allow clearance between them and the box, the upper surface of said box being convexly curved for permitting rocking movement of said box on said upper extension, and said journal box being formed with guiding portions embracing said pedestal means with clearance to permit said box to rotate slightly with respect thereto, said pedestal means being notched to accommodate said guiding portions.

12. A railway truck side frame designed for use with roller bearing journal boxes and provided with end portions equipped with side guides notched to embrace the sides of the journal boxes, each of said end portions comprising a substantially horizontally disposed part that is adapted to bear on the top side of the journal boxes, and said side guides being adapted to interlock with said journal boxes to limit lateral movement of the latter with relation to the side frame.

13. A railway truck side frame designed for use with roller bearing journal boxes and provided with end portions, each of which comprises a pair of vertically disposed side guides notched and spaced apart to receive the journal box, a strap arranged on the under side of the box and connected to said guides, and a horizontally disposed part on the side frame that is adapted to bear on the curved top side of an associated journal box, said side guides being adapted to interlock with said box for limiting relative lateral movement thereof.

14. The combination with a car-truck frame including a pedestal portion, of a box in said portion supportingly engaging a part thereof, an axle extending into one end of the box, a roller-bearing between the axle and the box, and curved surfaces between the pedestal portion and the box which permit the box to rock vertically and laterally about a point approximately coincident with the axis and longitudinal center of the bearing.

15. The combination with a car-truck frame comprising a pedestal, of a box in the pedestal, an axle extending into one end of the box, a roller-bearing between the axle and the box, retaining lugs projecting from the sides of the box to engage the legs of the pedestal, said box having a vertically curved surface to engage the frame and permit the box to rock vertically, and horizontally curved surfaces on the legs of said pedestal to permit the box to rock laterally about a point approximately coincident with the axis and longitudinal center of the bearing.

16. In a car truck, the combination of a frame comprising a pedestal, said pedestal having vertically extending legs connected by a portion extending longitudinally of the frame, a box confined in the pedestal between said legs and normally engaging said connecting portion, an axle extending into one end of the box, a roller bearing between the axle and the box, and horizontally curved surfaces on the legs of the pedestal to permit the box to rock laterally.

17. The combination of a journal box and a side frame, the box and frame having complementary arc shaped surfaces to permit lateral angling between box and frame, the said box and frame having also dissimilar engaging surfaces to permit vertical angling.

18. A journal box and side frame connection in which cooperating curved surfaces are formed on the box and frame to provide angular flexibility therebetween, said cooperating surfaces being spaced apart to also provide for lateral movement therebetween.

19. The combination of a journal box and side frame, said side frame having depending jaws provided with vertically extending curved surfaces for the reception of a journal box therebetween, said journal box having on its sides curved surfaces for co-operation with said jaw surfaces to provide horizontal angular flexibility therebetween, said side frame and top of said box having co-operating surfaces one of which is curved longitudinally of said box and straight transversely thereof whereby said box is held against axial rotation but is free to angle horizontally and vertically relative to said side frame.

CHARLES P. NOSER.